(12) United States Patent
Kaku

(10) Patent No.: US 12,743,854 B2
(45) Date of Patent: Sep. 22, 2026

(54) INFORMATION PROCESSING SYSTEM AND INFORMATION PROCESSING METHOD

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 18/533,680

(22) Filed: Dec. 8, 2023

(65) Prior Publication Data

US 2024/0221319 A1 Jul. 4, 2024

(30) Foreign Application Priority Data

Dec. 28, 2022 (JP) ................................ 2022-212670

(51) Int. Cl.
*G06T 19/00* (2011.01)
*G06F 3/01* (2006.01)
(Continued)

(52) U.S. Cl.
CPC .............. *G06T 19/00* (2013.01); *G06F 3/012* (2013.01); *H04W 4/023* (2013.01); *H04W 4/029* (2018.02); *G06T 2219/024* (2013.01)

(58) Field of Classification Search
CPC .. G06T 19/00; G06T 2219/024; H04W 4/029; H04W 4/023; G06F 3/012
See application file for complete search history.

(56) References Cited

U.S. PATENT DOCUMENTS 5,500,671 A * 3/1996 Andersson ............. H04N 7/144 348/E7.083
6,215,471 B1 * 4/2001 DeLuca ................ G06F 3/0304 345/158

(Continued)

FOREIGN PATENT DOCUMENTS

JP 2005-218103 A 8/2005
JP 2022-109048 A 7/2022

(Continued)

OTHER PUBLICATIONS

I. Feldmann, W. Waizenegger, N. Atzpadin and O. Schreer, “Real-time depth estimation for immersive 3D videoconferencing,” 2010 3DTV-Conference: The True Vision—Capture, Transmission and Display of 3D Video, Tampere, Finland, 2010, pp. 1-4, doi: 10.1109/3DTV.2010.5506312. (Year: 2010).*

(Continued)

*Primary Examiner* — Charles L Beard
(74) *Attorney, Agent, or Firm* — Oliff PLC

(57) ABSTRACT

An information processing system includes a plurality of terminal apparatuses each located at a predetermined distance from each of a plurality of users, wherein the plurality of terminal apparatuses includes a first terminal apparatus located at a predetermined distance from a first user, a second terminal apparatus located at a predetermined distance from a second user, and a third terminal apparatus located at a predetermined distance from a third user, each of the plurality of terminal apparatuses is configured to display, on a display, an image of each of other users, and the first terminal apparatus is configured to detect and transmit, to the third terminal apparatus, first distance information between the first user and the second user who is displayed on the display of the first terminal apparatus.

4 Claims, 4 Drawing Sheets

(51) Int. Cl.
*H04W 4/02* (2018.01)
*H04W 4/029* (2018.01)

(56) References Cited

U.S. PATENT DOCUMENTS 6,806,898 B1* 10/2004 Toyama .................... G06T 5/80 348/14.08
7,417,664 B2* 8/2008 Tomita ................... G02B 30/26 348/51
7,626,569 B2* 12/2009 Lanier ..................... G06F 3/012 348/42
8,184,141 B2* 5/2012 Caspi ..................... H04N 7/152 709/204
8,264,523 B2* 9/2012 Gachignard ........... H04N 7/144 348/14.08
8,416,715 B2* 4/2013 Rosenfeld ............. H04M 3/567 379/202.01
8,692,870 B2* 4/2014 Akeley ................ H04N 13/128 348/42
8,898,565 B2* 11/2014 Schroeter .................. H04L 9/00 715/706
9,148,625 B2* 9/2015 Kleinsteiber ............ H04N 7/15
9,451,210 B1* 9/2016 Smus ...................... G06F 3/012
9,524,588 B2* 12/2016 Barzuza .............. H04L 12/1827
9,536,133 B2* 1/2017 Kim ........................ G06T 19/00
9,541,998 B2* 1/2017 Klug .................... G02B 5/1842
9,704,216 B1* 7/2017 Laskar .................... G06F 3/012
9,741,141 B2* 8/2017 Tsurumi .................. G06T 11/60
9,843,713 B2* 12/2017 Kim ..................... H04N 23/695
9,865,068 B2* 1/2018 Tsurumi .................. G06T 11/60
10,063,604 B2* 8/2018 Crowe ................. H04L 65/403
10,284,812 B1* 5/2019 Van Os ................ H04N 5/2628
10,904,446 B1* 1/2021 Ostap ..................... H04N 23/61
10,928,904 B1* 2/2021 Novelli .................. G06F 3/013
10,951,858 B1* 3/2021 Ostap ..................... H04N 7/147
10,965,908 B1* 3/2021 Ostap ................... H04N 23/635
10,972,655 B1* 4/2021 Ostap ..................... H04N 7/147
10,999,531 B1* 5/2021 Bryan .................... G06V 40/10
11,019,216 B1* 5/2021 Martin .................... H04S 7/302
11,218,522 B1* 1/2022 Yerli ....................... G06T 19/00
11,290,688 B1* 3/2022 Krol .................... H04L 12/1813
11,360,634 B1* 6/2022 Chang ................... G06F 3/0481
11,374,988 B1* 6/2022 Lanier ..................... G06F 3/017
11,496,675 B2* 11/2022 Bryan .................... H04N 23/64
11,621,979 B1* 4/2023 Slotznick ............. H04L 65/403 348/14.07
11,694,438 B2* 7/2023 Rowe ...................... G06T 15/10 709/204
11,741,664 B1* 8/2023 Swanson ................ H04N 7/157 345/419
11,741,674 B1* 8/2023 Swanson ................. G06T 15/04 345/427
11,776,227 B1* 10/2023 Krol ........................ A63F 13/52 345/419
11,800,060 B1* 10/2023 Libin ................... G06V 40/174
11,805,225 B2* 10/2023 Xu ......................... G06V 40/28
11,871,147 B2* 1/2024 Sommerlade .......... H04N 7/152
12,028,651 B1* 7/2024 Braund .................. H04N 7/157
12,217,365 B1* 2/2025 Polyakov ................. G06T 3/40
12,272,003 B2* 4/2025 Kraus ..................... G06F 3/012
12,316,972 B2* 5/2025 Gandhi .................. G06V 10/22
12,367,642 B2* 7/2025 Polyakov ........... G06Q 20/3276
12,368,821 B2* 7/2025 Krol ....................... H04N 7/157
12,400,415 B2* 8/2025 Kaku ....................... G06T 19/20
12,430,709 B1* 9/2025 Dekel ..................... G06F 3/011
2004/0223061 A1* 11/2004 Bear ...................... H04N 7/142 348/207.99
2005/0162511 A1* 7/2005 Jackson .................. G06T 15/02 348/E7.08
2006/0008117 A1* 1/2006 Kanada ................... H04S 7/302 382/103
2008/0297589 A1* 12/2008 Kurtz ....................... H04N 7/15 348/E7.083
2010/0001994 A1* 1/2010 Kim ....................... G06V 40/20 715/848
2011/0085017 A1* 4/2011 Robinson ................. H04N 7/15 348/E7.083
2011/0085018 A1* 4/2011 Culbertson .............. H04N 7/15 348/E7.083
2011/0285807 A1* 11/2011 Feng ...................... G06V 40/70 704/E17.001
2011/0285809 A1* 11/2011 Feng ....................... G10L 25/78 348/E7.083
2011/0316984 A1* 12/2011 Akeley ................ H04N 13/128 348/51
2012/0182381 A1* 7/2012 Abate ................. H04L 12/1822 348/E7.083
2013/0155196 A1* 6/2013 Kim ....................... G01B 21/16 348/46
2013/0242030 A1* 9/2013 Kato .................... H04N 21/478 348/14.07
2014/0049595 A1* 2/2014 Feng ........................ H04N 7/15 348/E7.083
2014/0247207 A1* 9/2014 Pahud .................. G06F 1/1698 345/156
2014/0368602 A1* 12/2014 Woodgate ................. G06T 7/73 348/47
2014/0375752 A1* 12/2014 Shoemake ............. G06V 40/10 348/14.07
2015/0085056 A1* 3/2015 Van Broeck ............ G06F 3/013 348/14.1
2015/0089394 A1* 3/2015 Chen ..................... G06F 3/0484 715/753
2015/0237079 A1* 8/2015 Hirata ................ H04N 21/4223 348/14.07
2015/0248167 A1* 9/2015 Turbell ................. G06F 3/0481 715/754
2015/0332090 A1* 11/2015 Kumamoto ............ G06V 40/67 348/222.1
2015/0338924 A1* 11/2015 Watanabe ............. H04N 23/61 345/156
2015/0365627 A1* 12/2015 Deng ...................... G06T 13/80 348/14.07
2016/0050391 A1* 2/2016 Schultz .................. G06V 40/18 348/14.07
2016/0134838 A1* 5/2016 Tangeland ............. H04N 7/152 348/14.09
2016/0378183 A1* 12/2016 Teshome ................ G06V 40/19 382/100
2017/0069124 A1* 3/2017 Tong ....................... G06T 17/20
2018/0157321 A1* 6/2018 Liu .......................... G06F 3/013
2018/0329604 A1* 11/2018 Nakabo ................. H04L 67/131
2019/0007623 A1* 1/2019 Wang ..................... H04N 7/147
2019/0089769 A1* 3/2019 Rakshit ................... G06F 3/013
2019/0121600 A1* 4/2019 Kawano .................... G06F 3/16
2019/0129944 A1* 5/2019 Kawano .................... G06F 3/16
2020/0012471 A1* 1/2020 Itakura .................. G06F 3/1438
2020/0117270 A1* 4/2020 Gibson ................... G06F 3/011
2020/0225742 A1* 7/2020 Krishnakumar ....... H04N 23/71
2020/0294317 A1* 9/2020 Segal ..................... H04N 7/142
2021/0105437 A1* 4/2021 Terada .................. H04M 3/567
2021/0360199 A1* 11/2021 Oz ......................... G06N 3/094
2021/0377062 A1* 12/2021 Stevens ................. H04M 3/564
2022/0011927 A1* 1/2022 Sun .......................... H04R 3/04
2022/0070232 A1* 3/2022 Young .................. H04L 65/611
2022/0070237 A1* 3/2022 Yerli ....................... G06F 3/011
2022/0070238 A1* 3/2022 Yerli ....................... G06F 3/011
2022/0070241 A1* 3/2022 Yerli ....................... G06T 19/00
2022/0086203 A1* 3/2022 Morris .................... G06F 3/165
2022/0124140 A1* 4/2022 Okina .................... G06V 40/20
2022/0124283 A1* 4/2022 Krol ................... G06Q 30/0277
2022/0143503 A1* 5/2022 Weisman ............. A63F 13/213
2022/0150288 A1* 5/2022 Tokuchi ................. H04N 7/147
2022/0172424 A1* 6/2022 Vircíková .............. G06N 3/045
2022/0182524 A1* 6/2022 Rewatkar ............... H04N 7/147
2022/0224735 A1* 7/2022 Tokuchi ............... G06V 40/161
2022/0262326 A1* 8/2022 Sommerlade ............ G09G 5/10
2022/0277528 A1* 9/2022 Funazukuri ............. G06F 3/167
2022/0303452 A1* 9/2022 Wu ........................ H04N 23/62
2022/0311952 A1* 9/2022 Vanka ..................... G06F 3/017

(56) References Cited

U.S. PATENT DOCUMENTS

2022/0334638 A1* 10/2022 Anderson .............. G06V 10/98
2022/0365740 A1* 11/2022 Chang .................. G06F 3/1454
2022/0374136 A1* 11/2022 Chang .................. G06F 3/0488
2022/0385700 A1* 12/2022 Kasaba .................. H04L 51/02
2022/0404907 A1* 12/2022 Rubin .................... G06F 3/011
2023/0021918 A1* 1/2023 Back ...................... H04R 1/406
2023/0101902 A1* 3/2023 El Essaili .......... G02B 27/0093 715/757
2023/0122149 A1* 4/2023 Mccombe .............. G06F 3/012 382/103
2023/0137265 A1* 5/2023 Thiel ...................... G06T 15/20 348/14.08
2023/0138733 A1* 5/2023 Springer .............. H04N 7/0135 348/14.08
2023/0139126 A1* 5/2023 Thiel ...................... G06F 3/011 345/419
2023/0188372 A1* 6/2023 Stevens ............... G06F 3/04817 715/753
2023/0196680 A1* 6/2023 Kaku ...................... G06T 19/00
2023/0199041 A1* 6/2023 Schorr .................. G06F 3/0482 709/204
2023/0239432 A1* 7/2023 Deng ...................... H04N 7/15 348/14.08
2023/0239573 A1* 7/2023 Yuan .................... H04N 23/611 348/240.99
2023/0247179 A1* 8/2023 Kaku ...................... G06T 17/00 348/14.08
2023/0316663 A1* 10/2023 Yerli ...................... G06T 13/40 345/633
2023/0386096 A1* 11/2023 Kaku ...................... G06T 11/00
2023/0388454 A1* 11/2023 Fößel .................... G06T 19/006
2023/0401029 A1* 12/2023 P ........................... H04L 67/131
2024/0040086 A1* 2/2024 Krol ...................... G06T 17/005
2024/0061499 A1* 2/2024 Saragih .................. G06F 3/012
2024/0062580 A1* 2/2024 Li ........................ G06V 40/172
2024/0087234 A1* 3/2024 Monti ..................... A63F 13/79
2024/0087365 A1* 3/2024 Pylvaenaeinen ..... G06V 10/762
2024/0094812 A1* 3/2024 Kaku ...................... G06F 3/013
2024/0094980 A1* 3/2024 Sawado .............. H04L 12/1831
2024/0106969 A1* 3/2024 Thomasian ............. G10L 17/00
2024/0119731 A1* 4/2024 Hammer ................ G06V 20/41
2024/0129439 A1* 4/2024 Kaku ..................... H04N 7/157
2024/0154828 A1* 5/2024 Carluccio .......... H04N 21/2662
2024/0169319 A1* 5/2024 Kimura .................. G05B 15/02
2024/0320925 A1* 9/2024 Chai ..................... G06F 40/284
2024/0329731 A1* 10/2024 Magi ....................... G06F 3/013
2024/0331085 A1* 10/2024 Valli ......................... G06T 3/40
2024/0404206 A1* 12/2024 Chiu ....................... G06F 3/011
2024/0404227 A1* 12/2024 Chiu ....................... G06F 3/011
2024/0406349 A1* 12/2024 Thiel ....................... G06T 19/00
2024/0412473 A1* 12/2024 Hakobyan ............... G06F 3/011
2024/0422289 A1* 12/2024 Ostap ....................... H04N 7/15
2025/0016422 A1* 1/2025 Baijal ....................... G06F 3/16
2025/0022336 A1* 1/2025 Lee .................... H04N 21/2187
2025/0029328 A1* 1/2025 Smith .................... H04N 7/157
2025/0046042 A1* 2/2025 Bryan ................... G06T 19/003
2025/0047811 A1* 2/2025 Desai ....................... H04N 7/15
2025/0077041 A1* 3/2025 Ito ....................... G06F 3/04815
2025/0086873 A1* 3/2025 Baszucki ............. G06V 40/171
2025/0086880 A1* 3/2025 Mayer ..................... A63F 13/52
2025/0111472 A1* 4/2025 Lutter ..................... G06F 3/013
2025/0131669 A1* 4/2025 Carter ..................... G06T 19/20
2025/0139843 A1* 5/2025 Kaku ...................... G06F 3/013
2025/0159108 A1* 5/2025 Winsvold ............. G06V 40/172
2025/0168026 A1* 5/2025 Biggs ...................... G06F 3/013
2025/0218098 A1* 7/2025 Sugahara ................ H04L 67/54
2025/0232521 A1* 7/2025 Wilson .................. H04L 65/403
2025/0238114 A1* 7/2025 Sorrentino, III ........ G06F 3/011
2025/0260787 A1* 8/2025 Hafstad .................. H04N 7/141
2025/0286979 A1* 9/2025 Korneliussen ............ G06T 3/18
2025/0315193 A1* 10/2025 Kawano .................... G06F 3/14
2025/0363603 A1* 11/2025 Liao .......................... G06T 3/40
2026/0094353 A1* 4/2026 Chalmers ............ G06F 3/04815
2026/0156406 A1* 6/2026 Fukaya .................. H04R 1/326

FOREIGN PATENT DOCUMENTS

WO 2009/004731 A1 1/2009
WO 2020/203999 A1 10/2020

OTHER PUBLICATIONS

D. Roberts et al., "Communicating Eye-gaze Across a Distance: Comparing an Eye-gaze enabled Immersive Collaborative Virtual Environment, Aligned Video Conferencing, and Being Together," 2009 IEEE Virtual Reality Conference, Lafayette, LA, USA, 2009, pp. 135-142, doi: 10.1109/VR.2009.4811013. (Year: 2009).*

* cited by examiner

FIG. 6

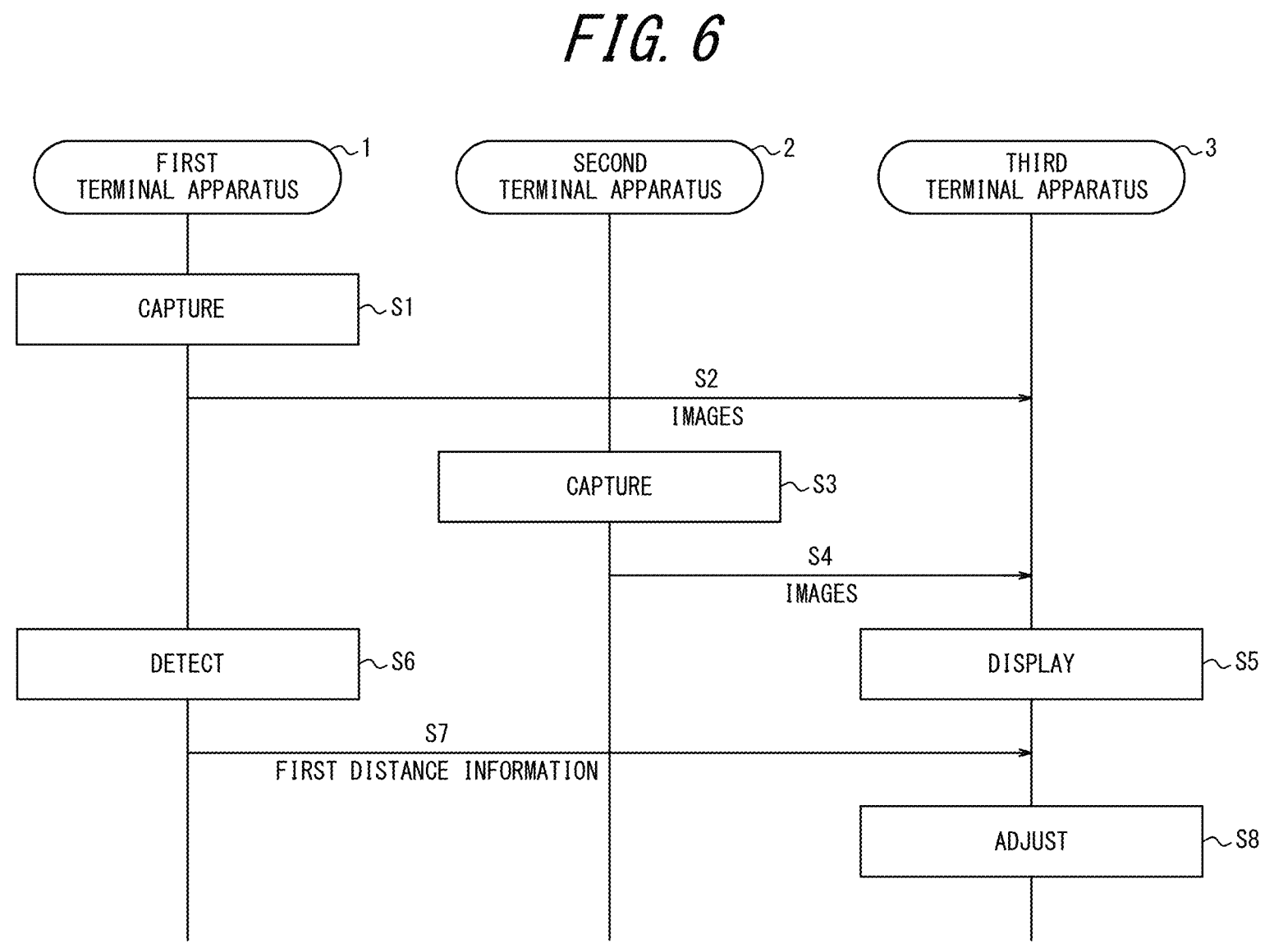

1 FIRST TERMINAL APPARATUS
2 SECOND TERMINAL APPARATUS
3 THIRD TERMINAL APPARATUS
S1 CAPTURE
S2 IMAGES
S3 CAPTURE
S4 IMAGES
S5 DISPLAY
S6 DETECT
S7 FIRST DISTANCE INFORMATION
S8 ADJUST

INFORMATION PROCESSING SYSTEM AND INFORMATION PROCESSING METHOD

CROSS-REFERENCE TO RELATED APPLICATION

This application claims priority to Japanese Patent Application No. 2022-212670, filed on Dec. 28, 2022, the entire contents of which are incorporated herein by reference.

TECHNICAL FIELD

The present disclosure relates to an information processing system and an information processing method.

BACKGROUND

Technology in which a second terminal displays a virtual space including a first avatar corresponding to a first user and a second avatar corresponding to a second user, and operates the first avatar based on a selected operation pattern and operates the second avatar based on second video data that images the second user is known. For example, see Patent Literature (PTL) 1.

CITATION LIST

Patent Literature

PTL 1: WO 2020/203999 A1

SUMMARY

When users have direct dialogues, nonverbal communication occurs simultaneously in addition to verbal communication. However, there is room for improvement for adequate communication in remote dialogues in which an interlocutor is fixedly displayed on a screen.

It would be helpful to facilitate nonverbal communication other than speech to enable smooth dialogues.

An information processing system according to an embodiment of the present disclosure is an information processing system including a plurality of terminal apparatuses each located at a predetermined distance from each of a plurality of users, wherein the plurality of terminal apparatuses includes a first terminal apparatus located at a predetermined distance from a first user, a second terminal apparatus located at a predetermined distance from a second user, and a third terminal apparatus located at a predetermined distance from a third user, each of the plurality of terminal apparatuses is configured to display, on a display, an image of each of other users, and the first terminal apparatus is configured to detect and transmit, to the third terminal apparatus, first distance information between the first user and the second user who is displayed on the display of the first terminal apparatus.

An information processing method according to an embodiment of the present disclosure is an information processing method by a plurality of terminal apparatuses each located at a predetermined distance from each of a plurality of users, the plurality of terminal apparatuses including a first terminal apparatus located at a predetermined distance from a first user, a second terminal apparatus located at a predetermined distance from a second user, and a third terminal apparatus located at a predetermined distance from a third user, the information processing method including:

displaying on a display, by each of the plurality of terminal apparatuses, an image of each of other users; and detecting and transmitting to the third terminal apparatus, by the first terminal apparatus, first distance information between the first user and the second user who is displayed on the display of the first terminal apparatus.

According to an embodiment of the present disclosure, it is possible to facilitate nonverbal communication other than speech to enable smooth dialogues.

BRIEF DESCRIPTION OF THE DRAWINGS

In the accompanying drawings:

FIG. 6 is a sequence diagram illustrating operations performed by the information processing system.

DETAILED DESCRIPTION

Figure 1:
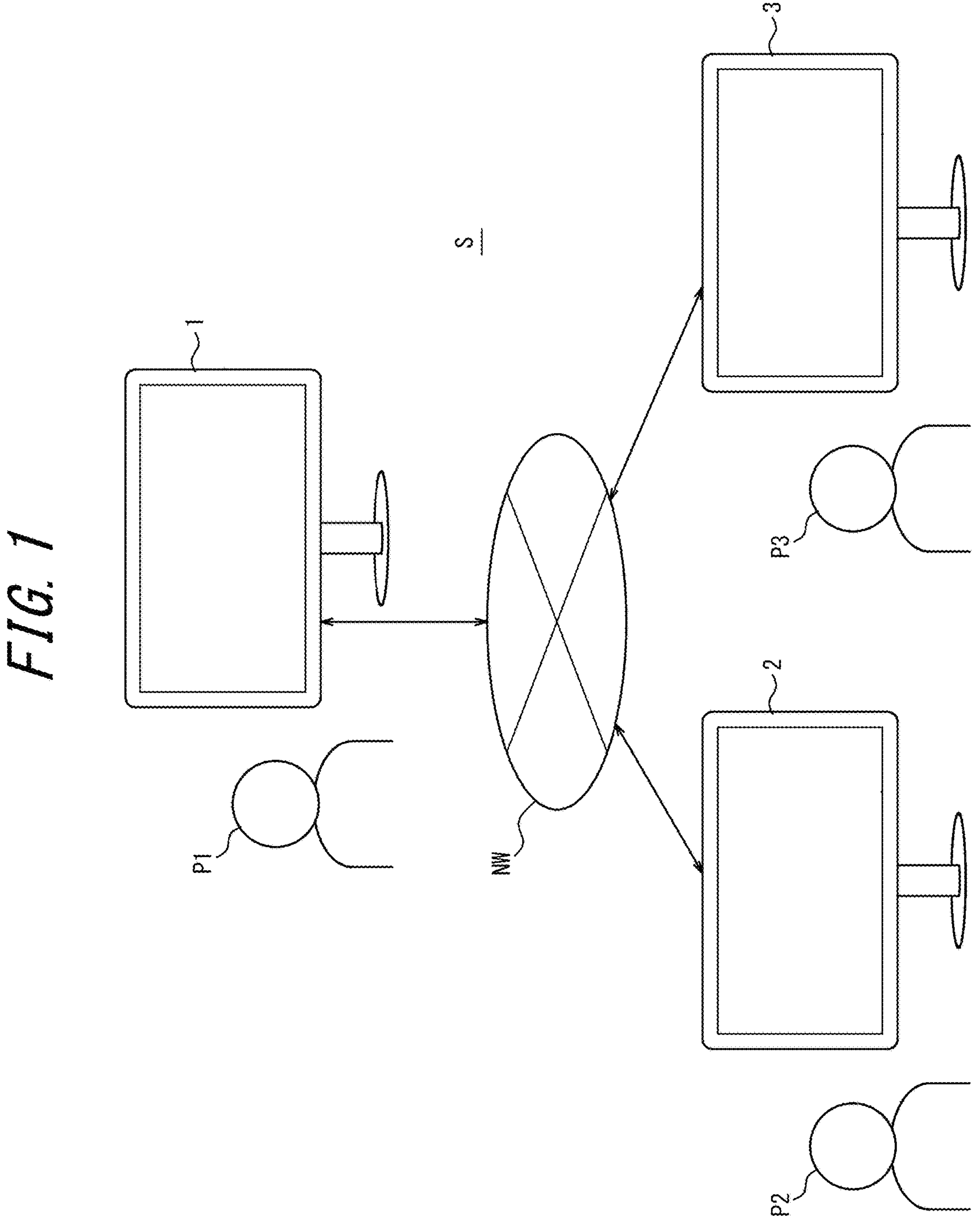
FIG. 1 is a schematic diagram of an information processing system.

FIG. 1 is a schematic diagram of an information processing system S according to the present embodiment. The information processing system S includes a first terminal apparatus 1, a second terminal apparatus 2, and a third terminal apparatus 3, which are communicably connected to each other via a network NW. The network NW includes, for example, a mobile communication network, a fixed communication network, or the Internet. The first terminal apparatus 1 is used by a first user P1. The second terminal apparatus 2 is used by a second user P2. The third terminal apparatus 3 is used by a third user P3. Each of the first terminal apparatus 1, second terminal apparatus 2, and third terminal apparatus 3 is located at a predetermined distance from each of the first user P1, second user P2, and third user P3.

FIG. 1 illustrates three of the terminal apparatuses for convenience of explanation. However, the number of the terminal apparatuses is not limited to this.

Figure 2:
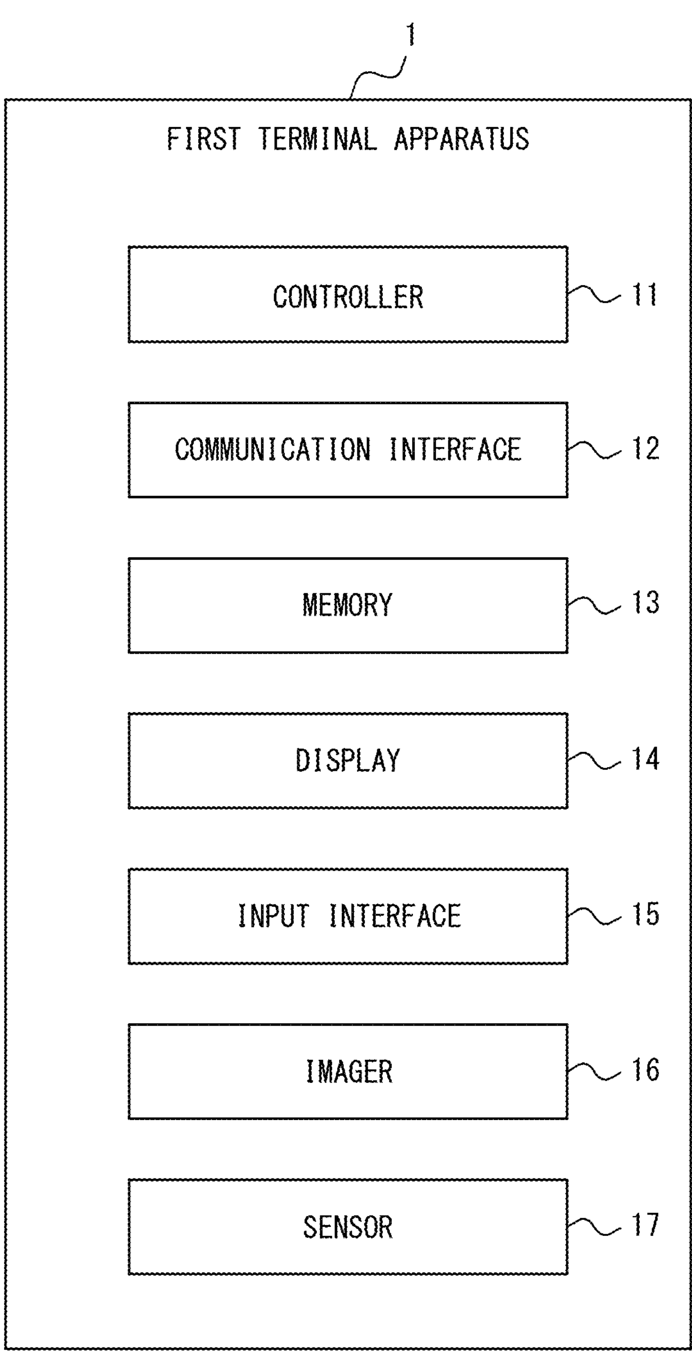
FIG. 2 is a block diagram illustrating a configuration of a first terminal apparatus.

With reference to FIG. 2, an internal configuration of the first terminal apparatus 1 is described in detail.

The first terminal apparatus 1 may be, for example, a general purpose device such as a PC, or a dedicated device. The term "PC" is an abbreviation of personal computer. As an alternative example, the first terminal apparatus 1 may be a mobile device such as a mobile phone, a smartphone, a wearable device, or a tablet.

The first terminal apparatus 1 includes a controller 11, a communication interface 12, a memory 13, a display 14, an input interface 15, an imager 16, and a sensor 17. The components of the first terminal apparatus 1 are communicably connected to one another via, for example, dedicated lines.

The controller 11 includes, for example, one or more general purpose processors including a Central Processing Unit (CPU) or a Micro Processing Unit (MPU). The controller 11 may include one or more dedicated processors that are dedicated to specific processing. The controller 11 may include one or more dedicated circuits instead of the processors. Examples of the dedicated circuits may include a Field-Programmable Gate Array (FPGA) and an Application Specific Integrated Circuit (ASIC). The controller 11 may include an Electronic Control Unit (ECU). The controller 11 transmits and receives any information via the communication interface 12.

The communication interface 12 includes one or more communication modules for connection to the network NW that conform to wired or wireless Local Area Network (LAN) standards. The communication interface 12 may include a module conforming to one or more mobile communication standards including the Long Term Evolution (LTE) standard, the 4th Generation (4G) standard, or the 5th Generation (5G) standard. The communication interface 12 may include one or more communication modules conforming to near field communication standards or specifications, including Bluetooth® (Bluetooth® is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communication interface 12 transmits and receives any information via the network NW.

The memory 13 includes, for example, a semiconductor memory, a magnetic memory, an optical memory, or a combination of at least two of these, but is not limited to these. The semiconductor memory is, for example, RAM or ROM. The RAM is, for example, SRAM or DRAM. The ROM is, for example, EEPROM. The memory 13 may function as, for example, a main memory, an auxiliary memory, or a cache memory. The memory 13 may store information resulting from analysis or processing performed by the controller 11. The memory 13 may also store various types of information, etc., regarding operations and control of the first terminal apparatus 1. The memory 13 may store a system program, an application program, embedded software, and the like. The memory 13 may be provided outside the first terminal apparatus 1 and accessed by the first terminal apparatus 1.

The display 14 is, for example, a display. The display is, for example, an LCD or an organic EL display. The term "LCD" is an abbreviation of liquid crystal display. The term "EL" is an abbreviation of electro luminescence. The display 14, instead of being included in the first terminal apparatus 1, may be connected to the first terminal apparatus 1 as an external output device. As a connection method, any technology such as USB, HDMI® (HDMI is a registered trademark in Japan, other countries, or both), or Bluetooth® can be used.

The input interface 15 is, for example, a physical key, a capacitive key, a pointing device, a touch screen integrally provided with a display, or a microphone. The input interface 15 accepts an operation for inputting information to be used for the operations of the first terminal apparatus 1. The input interface 15, instead of being included in the first terminal apparatus 1, may be connected to the first terminal apparatus 1 as an external input device. As a connection method, any technology such as USB, HDMI® (HDMI is a registered trademark in Japan, other countries, or both), or Bluetooth® can be used. The term "USB" is an abbreviation of Universal Serial Bus. The term "HDMI®" is an abbreviation of High-Definition Multimedia Interface.

The imager 16 includes a camera. The imager 16 can capture images of its surroundings. The imager 16 may store the captured images in the memory 13 or transmit the captured images to the controller 11 for the purpose of image analysis. The images include still or moving images.

The sensor 17 may be, for example, a distance-measuring sensor. The imager 16 and sensor 17 may be external. In this case, for example, the imager 16 and sensor 17 meet the requirements of the present embodiment if their position with the first terminal apparatus 1 is known.

The second terminal apparatus 2 includes a controller 21, a communication interface 22, a memory 23, a display 24, an input interface 25, an imager 26, and a sensor 27. The third terminal apparatus 3 includes a controller 31, a communication interface 32, a memory 33, a display 34, an input interface 35, an imager 36, and a sensor 37. A description of the hardware configuration of each of the second terminal apparatus 2 and third terminal apparatus 3 may be the same as the description of the hardware configuration of the first terminal apparatus 1. An explanation here is omitted.

Figure 3:
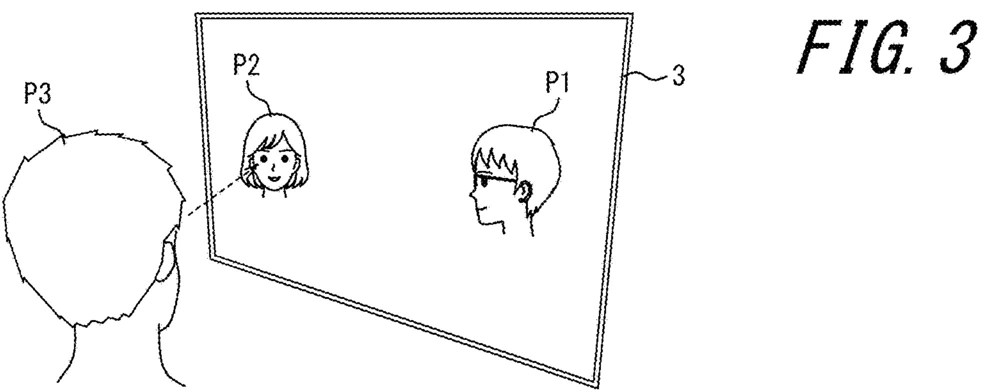
FIG. 3 is a diagram illustrating a first scene of a remote dialogue.

Hereinafter, an information processing method executed by the information processing system S will be described in detail. As an example here, the first user P1, the second user P2, and the third user P3, each located in a different location, conduct a dialogue using the information processing system S. As an example, the dialogue is a remote dialogue. The number of people conducting the dialogue can be any number of people as long as there is more than one. Each user's terminal apparatus captures images of the user using the terminal apparatus with the imager 26, and sequentially transmits the captured images to the other users' terminal apparatuses. Each user's terminal apparatus displays images (e.g., 3D models) of each of the other users on its display during the execution of the remote dialogue. As illustrated in FIG. 3, the third terminal apparatus 3 of the third user P3 displays the first user P1 and the second user P2 on the display 34. In FIG. 3, the second user P2 and the third user P3 are looking at each other. Therefore, in FIG. 4, the line of sight P2*e* of the second user P2 is aligned with the line of sight P3*e* of the third user P3.

Figure 4:
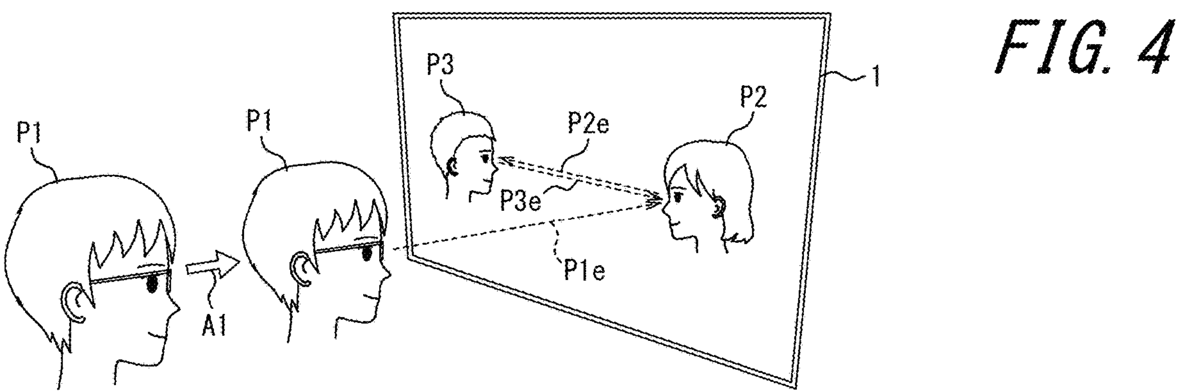
FIG. 4 is a diagram illustrating a second scene of the remote dialogue.

As illustrated in FIG. 4, the first user P1 approaches the second user P2 in the direction of arrow A1, looking at the second user P2 along the line of sight P1*e*. The controller 11 of the first terminal apparatus 1 sequentially detects, using the sensor 17, first distance information indicating the first distance between the position of the first user P1 (e.g., the position of the face of the first user P1) and the position of the 3D model of the second user P2 on the display 14. The controller 11 of the first terminal apparatus 1 sequentially transmits the detected first distance information to the third terminal apparatus 3 of the third user P3.

As an alternative example, the first terminal apparatus 1 may detect and transmit the first distance information between the position of the first user P1 and the position of the second user P2 on the display 14 only while the first user P1 is looking at the second user P2 on the display 14 (i.e., while the line of sight or face of the first user P1 is directed toward the second user P2 on the display 14). In other words, the first terminal apparatus 1 does not detect and transmit the first distance information while the first user P1 is not looking at the second user P2.

Figure 5:
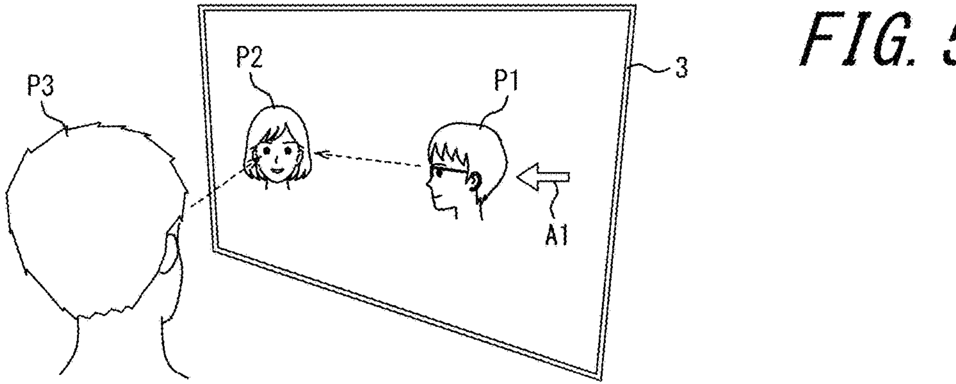
FIG. 5 is a diagram illustrating a third scene of the remote dialogue.

The controller 31 of the third terminal apparatus 3 of the third user P3 adjusts the distance information indicating the distance on the display 34 between the 3D model of the first user P1 and the 3D model of the second user P2 based on the first distance information sequentially transmitted from the first terminal apparatus 1. Adjustment is to shorten or lengthen the distance. Therefore, as the first user P1 approaches the second user P2 in the direction of arrow A1 as illustrated in FIG. 4, in the third terminal apparatus 3 in FIG. 5, the first user P1 approaches the second user P2 in the direction of arrow A1. For example, the controller 31 may increase or decrease (e.g., decrease by 10%) the distance information between the 3D model of the first user P1 and the 3D model of the second user P2 on the display 34 according to the rate (e.g., decrease by 10%) at which the first distance information between the position of the first user P1 and the 3D model of the second user P2 has increased or decreased. The controller 31 of the third terminal apparatus 3 may adjust the distance information between the first user P1 and the second user P2 on the display 34 to be shorter, the shorter the first distance information transmitted from the first terminal apparatus 1 is. As an alternative example, the controller 31 may increase or decrease the distance information between the 3D model of the first user P1 and the 3D model of the second user P2 on the display 34 according to a value at which the first distance information has increased or decreased.

As an additional example, the second terminal apparatus 2 may sequentially detect and transmit, to the third terminal apparatus 3, second distance information indicating the second distance between the position of the second user P2 and the position of the first user P1 on the display 24 of the second terminal apparatus 2. In this case, the third terminal apparatus 3 may adjust the distance information between the first user P1 and the second terminal apparatus 2 on the display 34 based on the total distance of the first distance information sequentially transmitted from the first terminal apparatus 1 and the second distance information sequentially transmitted from the second terminal apparatus 2. For example, the controller 31 may increase or decrease (e.g., decrease by 10%) the distance information between the 3D model of the first user P1 and the 3D model of the second user P2 on the display 34 according to the rate (e.g., decrease by 10%) at which the total distance has increased or decreased.

The above embodiment describes a case in which the first user P1 approaches the second user P2 and the distance information is adjusted at the third terminal apparatus 3 of the third user P3. However, the first user P1, second user P2, and third user P3 can be arbitrarily interchanged.

Referring to FIG. 6, an information processing method executed by the information processing system S at any given point in time is described.

In step S1, the first terminal apparatus 1 captures images of the first user P1. In step S2, the first terminal apparatus 1 transmits the captured images to the third terminal apparatus 3.

In step S3, the second terminal apparatus 2 captures images of the second user P2. In step S4, the second terminal apparatus 2 transmits the captured images to the third terminal apparatus 3. Steps S3 and S4 may be performed before steps S1 and S2.

In step S5, the third terminal apparatus 3 displays a 3D model of the first user P1 and a 3D model of the second user P2 on the display 34 according to the received captured images.

In step S6, the first terminal apparatus 1 detects first distance information between the first user P1 and the second user P2 on the display 14. In step S7, the first terminal apparatus 1 transmits the first distance information to the third terminal apparatus 3.

In step S8, the third terminal apparatus 3 adjusts distance information indicating the distance between the first user P1 and the second user P2 on the display 34 of the third terminal apparatus 3 based on the first distance information transmitted from the first terminal apparatus 1.

As described above, according to the present embodiment, the third terminal apparatus 3 adjusts the distance information between the first user P1 and the second user P2 on the display 14 of the third terminal apparatus 3 based on the first distance information transmitted from the first terminal apparatus 1. This configuration allows the information processing system S to enable the third user P3 to see a change (fluctuation) in the distance between the first user P1 and the second user P2. The information processing system S thus can facilitate nonverbal communication other than speech to enable smooth dialogues.

According to the present embodiment, the third terminal apparatus 3 adjusts the distance information between the first user P1 and the second user P2 to be shorter on the display 14 of the third terminal apparatus 3, the shorter the first distance information transmitted from the first terminal apparatus 1 is. With this configuration, for example, when the first user P1 approaches or moves away from the second user P2 on the display 14, the third user can see the distance between the first user P1 and the second user P2 on the display 34 shorten or lengthen. Thus, the information processing system S can make it easier for the third user P3 to understand the distance of the first user P1 to the second user P2.

According to the present embodiment, the third terminal apparatus 3 adjusts the distance information between the first user P1 and the second user P2 on the display 34 of the third terminal apparatus 3 based on the total distance of the first distance information transmitted from the first terminal apparatus 1 and the second distance information transmitted from the second terminal apparatus 2. This configuration allows the information processing system S to make it easier for the third user P3 to understand the distance of the first user P1 and the second user P2 to each other.

According to the present embodiment, the first terminal apparatus 1 detects and transmits the first distance information only while the first user P1 is looking at the second user P2 on the display 14. This configuration allows the information processing system S to reduce the possibility of the distance between the first user P1 and the second user P2 changing on the display 34 of the third terminal apparatus 3, for example, when the first user P1 changes his/her posture independently of the second user P2.

While the present disclosure has been described with reference to the drawings and examples, it should be noted that various modifications and revisions may be implemented by those skilled in the art based on the present disclosure. Other modifications can be made without departing from the spirit of the present disclosure. For example, functions or the like included in each means or each step can be rearranged without logical inconsistency, and a plurality of means or steps can be combined into one or divided.

For example, in the above embodiment, a program that executes all or part of the functions or processing of the first terminal apparatus 1, the second terminal apparatus 2, or the third terminal apparatus 3 may be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of any server and transmitting the program from any server to another computer. The program may be provided as a program product. The present disclosure can also be implemented as a program executable by a processor.

A computer temporarily stores in a main memory, for example, the program recorded on the portable recording medium, or the program transferred from the server. Then, the computer reads the program stored in the main memory using a processor, and executes processes in accordance with the read program using the processor. The computer may read the program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

The invention claimed is:

1. An information processing system comprising a plurality of terminal apparatuses each located at a predetermined distance from each of a plurality of users, wherein the plurality of terminal apparatuses comprises a first terminal apparatus located at a predetermined distance from a first user, a second terminal apparatus located at a predetermined distance from a second user, and a third terminal apparatus located at a predetermined distance from a third user, each of the plurality of terminal apparatuses is configured to display, on a display, an image of each of other users, the first terminal apparatus is configured to detect and transmit, to the third terminal apparatus, first distance information between the first user in real space and the second user who is displayed on the display of the first terminal apparatus only while the first user in real space is looking at the second user who is displayed on the display of the first terminal apparatus, the third terminal apparatus is configured to adjust, based on the first distance information transmitted from the first terminal apparatus, distance information between the first user and the second user who are displayed on the display of the third terminal apparatus, the third terminal apparatus is configured to adjust the distance information between the first user and the second user who are displayed on the display of the third terminal apparatus to be shorter, the shorter the first distance information transmitted from the first terminal apparatus is, and the third terminal apparatus is configured to align lines of sight of the first user and the second user who are displayed on the display of the third terminal apparatus while the first user in real space is looking at the second user who is displayed on the display of the first terminal apparatus.

2. The information processing system according to claim 1, wherein the second terminal apparatus is configured to detect and transmit, to the third terminal apparatus, second distance information between the second user in real space and the first user who is displayed on the display of the second terminal apparatus, and the third terminal apparatus is configured to adjust the distance information between the first user and the second user who are displayed on the display of the third terminal apparatus, based on a total distance of the first distance information transmitted from the first terminal apparatus and the second distance information transmitted from the second terminal apparatus.

3. An information processing method by a plurality of terminal apparatuses each located at a predetermined distance from each of a plurality of users, the plurality of terminal apparatuses comprising a first terminal apparatus located at a predetermined distance from a first user, a second terminal apparatus located at a predetermined distance from a second user, and a third terminal apparatus located at a predetermined distance from a third user, the information processing method comprising:

displaying on a display, by each of the plurality of terminal apparatuses, an image of each of other users;

detecting and transmitting to the third terminal apparatus, by the first terminal apparatus, first distance information between the first user in real space and the second user who is displayed on the display of the first terminal apparatus only while the first user in real space is looking at the second user who is displayed on the display of the first terminal apparatus;

adjusting on the third terminal apparatus, based on the first distance information transmitted from the first terminal apparatus, distance information between the first user and the second user who are displayed on the display of the third terminal apparatus;

adjusting on the third terminal apparatus, the distance information between the first user and the second user who are displayed on the display of the third terminal apparatus to be shorter, the shorter the first distance information transmitted from the first terminal apparatus is; and aligning on the third terminal apparatus, lines of sight of the first user and the second user who are displayed on the display of the third terminal apparatus while the first user in real space is looking at the second user who is displayed on the display of the first terminal apparatus.

4. The information processing method according to claim 3, further comprising:

detecting and transmitting to the third terminal apparatus, by the second terminal apparatus, second distance information between the second user in real space and the first user who is displayed on the display of the second terminal apparatus; and adjusting on the third terminal apparatus, the distance information between the first user and the second user who are displayed on the display of the third terminal apparatus, based on a total distance of the first distance information transmitted from the first terminal apparatus and the second distance information transmitted from the second terminal apparatus.

* * * * *